United States Patent [19]

Christenson

[11] Patent Number: 5,261,797

[45] Date of Patent: * Nov. 16, 1993

[54] INTERNAL COMBUSTION ENGINE/FLUID PUMP COMBINATION

[76] Inventor: Howard W. Christenson, 128 W. 73rd St., Indianapolis, Ind. 46260

[*] Notice: The portion of the term of this patent subsequent to May 5, 2009 has been disclaimed.

[21] Appl. No.: 830,657

[22] Filed: Feb. 4, 1992

[51] Int. Cl.⁵ .................. F04B 17/00; F04B 35/00
[52] U.S. Cl. ................... 417/380; 417/392
[58] Field of Search ............. 417/380, 392, 540, 340, 417/364

[56] References Cited

U.S. PATENT DOCUMENTS

| | | |
|---|---|---|
| 878,783 | 2/1908 | Downie . |
| 1,637,765 | 8/1927 | Comstock . |
| 2,046,903 | 7/1936 | List . |
| 3,056,638 | 10/1962 | Hovde . |
| 3,380,556 | 4/1968 | Whitehead . |
| 3,992,980 | 11/1976 | Ryan et al. . |
| 4,567,815 | 2/1986 | Kocher . |
| 4,836,150 | 6/1989 | Yang ............... 417/380 |
| 4,838,216 | 6/1989 | Yang ............... 417/380 |
| 4,924,670 | 5/1990 | Bausch et al. ...... 417/540 |
| 5,064,360 | 11/1991 | Blum ............... 417/540 |
| 5,109,810 | 5/1992 | Christenson ........ 417/380 |

OTHER PUBLICATIONS

*Design Feasibility of a Free Piston Internal Combustion Engine/Hydraulic Pump*, Long-Jang Li and Norman H. Beachley, SAE Technical Paper Series, International Congress and Exposition, Detroit, Mich. Feb. 29–Mar. 4, 1988.

*Primary Examiner*—Richard A. Bertsch
*Assistant Examiner*—Alfred Basichas
*Attorney, Agent, or Firm*—Woodard, Emhardt, Naughton, Moriarty & McNett

[57] ABSTRACT

A two cycle internal combustion engine is disclosed incorporating a spherical joint between the piston and the connecting rod. The spherical joint draws lubricating oil into a clearance volume, wherein the oil is sealed therein to hydrostatically transfer piston loads thereacross as the piston reciprocates. The engine further includes a working pump piston for operating on hydraulic fluid. An accumulator chamber is also provided in combination with the engine, wherein the pressure of the fluid in the accumulator chamber is maintained equal to the working fluid pressure of the engine pump by valve means. Also disclosed is a pulse pressure booster for delivering charged air to the combustion chamber of the engine. The pulse pressure booster receives pressurized sump gas and includes a piston for separating the inlet air from the sump gas while communicating pressures thereacross. Also disclosed is an improved reaction valve in the hydrocycle engine pump, wherein the valve incorporates a spring disk configuration to facilitate faster opening of the reaction valve.

7 Claims, 3 Drawing Sheets

INTERNAL COMBUSTION ENGINE/FLUID PUMP COMBINATION

BACKGROUND OF THE INVENTION

The present invention relates generally to an internal combustion engine and, more specifically, to an improved wrist pin connection, charged air delivery system and accumulator system for an internal combustion engine. The invention also concerns improvements to an engine for conversion of combustion energy to fluid displacement work, such as the engine described in U.S. patent application Ser. No. 07/587,233 to the same inventor.

Much recent attention has been focused upon the use of electronic controls to monitor the air fuel mixture delivered to the engine, electronic fuel injectors to optimize the spray of fuel into the engine cylinder, and catalytic converters to reduce noxious emissions. Thus far, the focus of engine developers has been based upon standard internal combustion engine principles in which an air fuel mixture is ignited within a combustion cylinder. One recent example is represented by the two cycle engine of the Orbital Engine Company of Perth, Australia.

In my prior patent application Ser. No. 587,223, which issued on May 5, 1991 as U.S. Pat. No. 5,109,810, I disclosed an internal combustion engine, known as the "hydrocycle" engine, which provided significant improvements in fuel economy, emissions reduction, operation efficiency, power output availability and engine life. Further improvements in operational efficiency and engine durability, for example, would enhance my "hydrocycle" engine and perhaps find application in other internal combustion engines as well.

One such area of improvement includes the joint between the piston and the connecting rod. Kocher, U.S. Pat. No. 4,567,815, discloses a crank pin, connecting rod and bearing assembly adapted for use in apparatuses such as refrigerator compressors or the like, wherein high pressure hydrodynamic lubrication is provided in the load bearing zone between an upper bearing section and the crank pin. Comstock, U.S. Pat. No. 1,637,765, describes a piston and connecting rod construction, wherein the piston incorporates a semispherical recess and the connecting rod is connected to a spherical head.

Another area of improvement include the supply of air to the engine. For example, in my prior U.S. Pat. No. 5,109,810 I disclosed a mechanically driven centrifugal supercharger which delivers an air charge to a hydrocycle engine. Still other areas of improvement relate generally to the prevention of engine knock. For example, in my "hydrocycle" internal combustion engine, engine knock is reduced by the reaction piston assembly in which the pump piston quickly accelerates to facilitate the expansion of combustion gas.

There is always a need for an engine incorporating improvements in fuel economy, emissions reduction, operation efficiency, power output availability and engine life, to name but a few. Such an engine would include an improved piston to connecting rod joint. Such an engine would also include an improved air delivery system for delivering charged air to the engine. Also desirous is an improved "hydrocycle" engine, wherein further improvements in preventing engine knock are provided.

SUMMARY OF THE INVENTION

An internal combustion engine is disclosed including a pump disposed at the head end of the combustion cylinder, the pump containing a working fluid for discharge therefrom. Improvements to the engine include an accumulator cylinder fluidly connected to the pump and an accumulator piston reciprocatably disposed within the accumulator cylinder. The accumulator piston contains the working fluid within the pump and defines an accumulator chamber within the accumulator cylinder for containing an accumulator fluid therein. The accumulator piston reciprocates within the accumulator cylinder to maintain the pressure of the accumulator fluid contained therein equal to the pressure of the working fluid contained within the pump.

An internal combustion engine is also disclosed having a piston reciprocatably disposed within a cylinder, wherein the piston is connected to a crankshaft by a connecting rod. The connecting rod connects to the crankshaft by a journal bearing at its crankshaft end, wherein lubricating oil is provided to the journal bearing. Improvements to the engine include an articulating spherical joint connecting the piston to the connecting rod, wherein the spherical joint includes a spherically-shaped ball articulating within a spherically-shaped cup. The spherical joint includes a predetermined amount of axial clearance so as to define a clearance volume therein. A passageway fluidly connects the spherical joint to the journal bearing, wherein the spherical joint intermittently draws lubricating oil from the journal bearing through the passageway to fill the clearance volume as the piston reciprocates. Means for sealing the lubricating oil within the spherical joint as the piston reciprocates is provided, wherein the lubricating oil sealed within the spherical joint hydrostatically supports loads transferred thereacross.

A two-cycle internal combustion engine is also disclosed including a combustion cylinder, a sump, and a compression piston reciprocatably disposed within the cylinder and defining a combustion chamber therein, wherein the cylinder includes intake and exhaust ports for communicating gas with the combustion chamber Improvements to the engine include a compressor and means for driving the compressor, wherein the compressor pressurizes gas for introduction into the combustion cylinder. A pressure boost cylinder is fluidly connected to the compressor, the cylinder intake ports and the sump. The pressure boost cylinder receives pressurized compressor gas from the compressor and intermittently supplies the pressurized compressor gas to the combustion chamber via the intake ports as the combustion piston reciprocates. The pressure boost cylinder also receives pressurized gas from the sump. A pressure boost piston is reciprocatably disposed within the pressure boost cylinder, wherein the pressure boost piston reciprocates to balance the pressurized compressor gas against the pressurized sump gas while maintaining separate the pressurized compressor gas therefrom.

One object of the present invention is to provide an improved internal combustion engine incorporating improvements in fuel economy, emissions reduction, operation efficiency, power output availability and engine life.

Another object of the present invention is to provide an internal combustion engine including an improved piston to connecting rod joint.

Another object of the present invention is to provide an internal combustion engine including an improved air delivery system for delivering charged air to the engine.

Another object of the present invention is to provide an improved hydrocycle internal combustion engine.

Another object of the present invention is to provide an improved hydrocycle internal combustion engine, wherein engine knock is reduced.

Related objects and advantages of the present invention will become apparent from the following description.

DESCRIPTION OF THE PREFERRED EMBODIMENT

Figure 1:
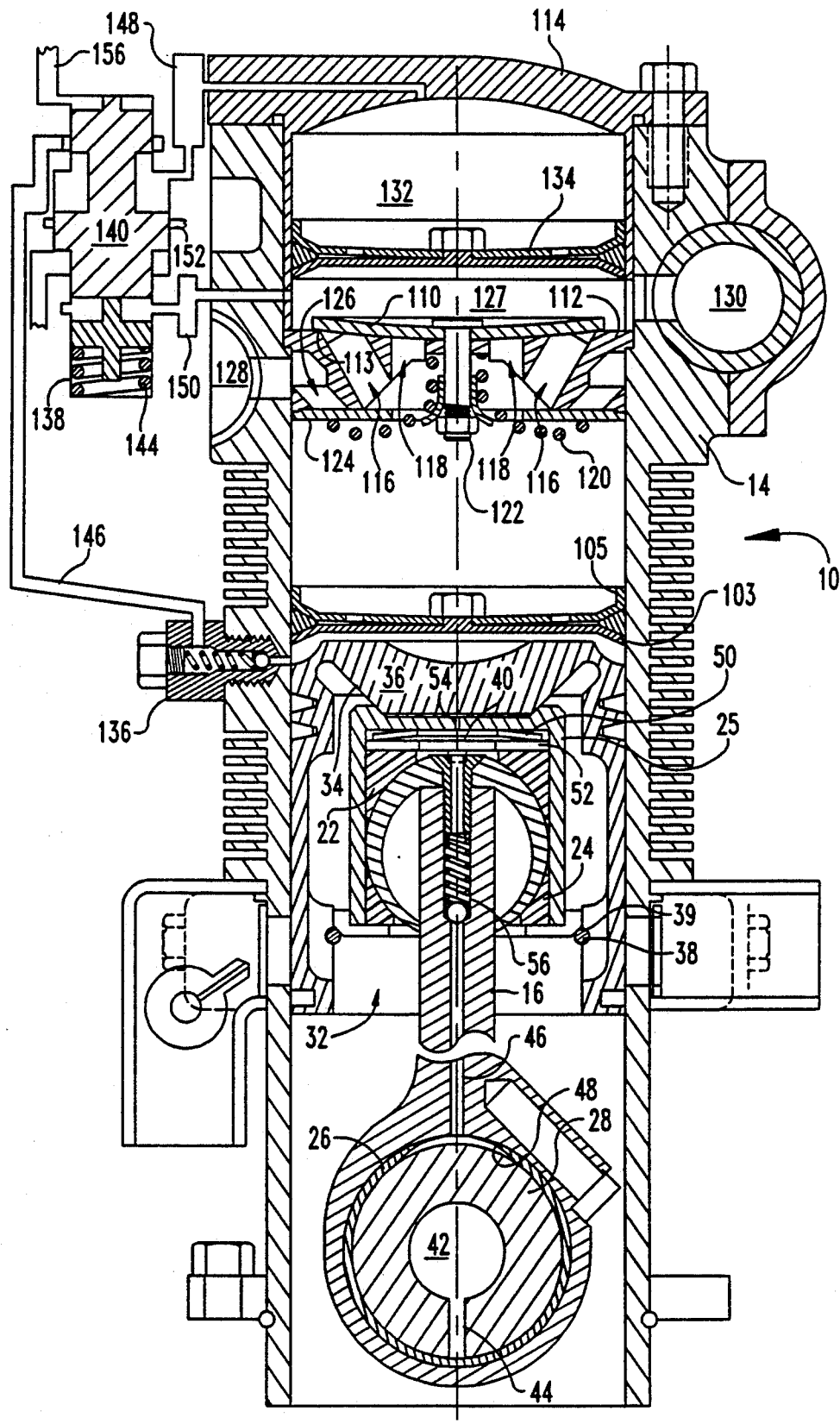
FIG. 1 is a side cross-sectional view of a two cycle internal combustion engine according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, an internal combustion engine 10 is shown. Engine 10 is a two-cycle internal combustion engine similar to that disclosed in my U.S. Pat. No. 5,109,810, which issued on May 5, 1992 and which disclosure is incorporated herein by reference. Engine 10 includes a piston 12 reciprocating in a combustion cylinder 14. A connecting rod 16 is connected to piston 12 at the connecting rod's piston end by way of an articulating spherical joint 18. The spherical joint includes a spherically-shaped ball 20 articulating within semi-spherically shaped cup portions 22 and 24 of removable cartridge unit 25. Ball 20 operates against the cup portions to transfer loads through the spherical joint while accommodating the reciprocating motion of the piston and connecting rod.

The connecting rod 16 includes a journal bearing at its crankshaft end in the form of a bushing 26 slidably engaging crankshaft 28, wherein the diametrical clearance between the bushing of the connecting rod and the crankshaft is set to standard journal bearing clearances.

Other spherical configurations forming the piston/connecting rod joint are contemplated as well. For example, spherical joint 18 is also contemplated having the spherically-shaped ball integral with piston 12, wherein the piston end of the connecting rod defines a semi-spherically shaped cup and includes a low-friction liner for receiving the ball therein.

To facilitate manufacturing, ball 20 is attached at the piston end of connecting rod 16 by fastener 30. Other fasteners and fastening techniques can be employed as well; for example, welding of the ball to the connecting rod. Similarly, ball 20 can be manufactured integral with connecting rod, wherein the spherical contour at the piston end of the connecting rod is machined from near net-shaped forgings or castings.

Removable cartridge unit 25 defines generally the semi-spherical cup for the spherical connection between piston 12 and connecting rod 16. Cartridge unit 25 is located within the hollow portion 32 of piston 12. Cartridge unit 25 is precisely located via a press fit between conically-shaped recess 34 of cartridge unit 25 and a mating conically-shaped tab portion or boss 36 of piston 12. Means for retaining the cartridge unit within the piston as the piston reciprocates is provided by a retaining ring or snap ring 38 seated in a circumferential slot 39 of piston 12. Ring 38 maintains the press fit between the cartridge unit 25 and the piston 12.

Upper cup portion 22 and lower cup portion 24 are fitted around the ball and within housing 27 of the cartridge unit with sufficient clearance to define a predetermined amount of axial travel of the ball 20 relative to the cartridge unit 25. Ball 20 is received between the upper and lower cup portions within cartridge unit 25. The cup portions operate to both align the ball within the housing so as to permit movement of the ball relative to the housing only in the axial direction and, in conjunction with the ball, to effectively seal lubricating oil within the housing of the cartridge unit. As a result, a predetermined clearance volume 40 is defined within the cartridge unit at the extent of travel of the ball relative to the housing of the cartridge unit.

In operation, lubricating oil fills the clearance volume and hydrostatically reacts the combustion loads transmitted from the piston to the connecting rod. In a spherical joint having a 2.25 inch diameter ball, approximately 0.025 inches of axial travel of the piston relative to the connecting rod is provided to define the clearance volume; however, the amount of axial travel can be varied according to the loads required to be reacted in a particular application.

The cup portions are constructed from a low-friction plastic such as TEFLON ® to reduce destructive wear within the spherical joint when little or no oil is supplied to the spherical joint; i.e., during starting of the engine. However, other materials such as bronze or aluminum cup portions are contemplated for use with cast iron pistons, as well as low-friction surface treatments or coatings applied to the cup portions. Other low-density materials which reduce the amount of reciprocating mass are also contemplated.

Crankshaft 28 includes oil passageways 42 and 44, and connecting rod 16 includes oil passageway 46 for communicating lubricating oil to clearance volume 40. Oil passageway 42 extends longitudinally through crankshaft 28 to an oil supply as commonly provided in the industry. The location of passageway 44 in the crankshaft is timed relative to the location of passageway 46 so that when the piston is at or near bottom dead center, crankshaft passageway 44 is aligned with connecting rod passageway 46. In this orientation, lubricating oil freely communicates between passageway 44 and cartridge unit 25 to fill the clearance volume. The spherical joint draws oil from the crankshaft as required to replace any oil which may have leaked from the spherical joint. Oil is drawn from the crankshaft to the spherical joint by the relative motion between the piston and connecting rod and, therefore, pressurized oil supplied through the crankshaft is not relied on to pump oil to the spherical joint.

To provide additional oil communication over a wider range of piston positions near bottom dead center, bushing 26 further incorporates a semi-circular scallop 48. As shown in FIG. 1, the scallop is symmetric about passageway 46 and open to the crankshaft to extend the supply of oil from passageway 44 to passageway 46 when passageway 44 is not directly aligned with passageway 46. The scallop may be also asymmetric about passageway 46 to take into account angular fluid velocities resulting from the rotation of the crankshaft.

As the piston continues its reciprocative motion, oil passageway 44 is positioned further remote from passageway 46 until it is furthest remote when the piston is at or near top dead center when maximum loads are transferred from the piston to the crankshaft, as shown in FIG. 1. When passageway 44 is not aligned with scallop 48 and passageway 46, oil passageway 46 is substantially sealed by the crankshaft within the bushing. Fluid viscous effects resulting from the reduced diametral clearance within the journal bearing further operate to seal oil from exiting passageway 46. Lubricating oil is therefore intermittently trapped in the spherical joint as the piston reciprocates, wherein the trapped oil hydrostatically operates to both react the combustion loads and fully distribute these loads across the spherical joint.

A belleville spring 50 is located within the clearance volume to assist the relative motion between the piston and connecting rod and to draw oil into the cartridge unit. Spring 50 seats against the housing on one side and against a washer 52 on the other side, wherein the washer minimizes damage to the plastic cup portions by preventing point contact and distributing loads. A bleed passageway 54 is provided through the housing to permit air to bleed therethrough and past the conical piston/cartridge unit interface.

Also shown in FIG. 1 is a one-way check valve 56 located in the connecting rod and across passageway 46 for providing additional sealing of lubricating oil within cartridge unit 25. As noted previously, small amounts of leakage of lubricating oil from the cartridge unit may occur due to the clearance in the journal bearing. Valve 56 operates independent of engine timing and angular position of the crankshaft to seal oil within the cartridge unit, instead operating only as a function of oil pressure differential across the valve. In this embodiment, oil is sealed within the spherical joint when the check valve is seated, regardless of the orientation of passageway 44 relative to passageway 46. The check valve unseats at a predetermined pressure differential across the valve to permit oil to be drawn from the crankshaft to replenish oil which may have leaked from the spherical joint.

By incorporating a spherical joint between the piston and connecting rod, the need for end bearings to locate the connecting rod relative to the crankshaft is eliminated. The spherical joint is self-aligning so that the cylinder and piston locate the connecting rod relative to the crankshaft. Furthermore, in addition to the hydrostatic bearing at the piston/connecting rod joint, a hydrostatic bearing is also contemplated at the connecting rod/crankshaft joint. For example, the crankshaft may employ sealing means for sealing oil within the journal bearing to define a hydrostatic thrust bearing to react and distribute combustion loads at the connecting rod/crankshaft joint. Means for sealing the journal bearing include a groove pocket in the journal bearing and facing the piston to restrict oil flow and maintain hydrostatic pressure in the journal bearing. With hydrostatic bearings at both ends, the check valve 50 may be deleted.

Because the spherical piston/connecting rod joint can be utilized with a variety of reciprocating motions, it need not be limited to a "hydrocycle" engine. Since the hydrostatic effect benefits applications which react high loads, those engines having high combustion pressures (i.e., high compression ratios) would benefit the most. For example, diesel engines would make an ideal application.

As shown in FIG. 1, engine 10 employs a reaction piston assembly 100 including a power piston 103 and a pumping member 105 attached to the power piston, in accordance with the engine described in U.S. Pat. No. 5,109,810. The reaction piston assembly reciprocates within cylinder 14 and balances combustion gas pressures in combustion chamber 106 with working oil pressures in chamber 108. In this embodiment, means for sealing oil within chamber 108 is provided by a spring disc valve including a flexible disc 110 seated against a seat 113 on valve plate 112. As shown in FIG. 1, valve plate 112 is located within cylinder 14 and is fixed in place by cylinder head 114.

Valve plate 112 incorporates a series of holes 116 and 118 for delivering fluid in chamber 108 to the upstream side of the valve. Holes 116 deliver fluid to the outer periphery of disc 110 to facilitate unseating of the valve, while holes 118 facilitate free fluid flow and provide additional fluid flow capacity. In operation, downstream fluid pressure in excess of the fluid pressure in chamber 108 causes the disc to flex and seal against seat 113 and across holes 116 and 118. As fluid pressure in chamber 108 builds, disc 110 flexes upward to unseat from the holes and seal only against seat 113 at its outer periphery. Further increases in fluid pressure in chamber 108 causes the flexible disc to lift off the seat and permit fluid flow thereacross. As such, disc 110 lifts quickly in response to fluid pressure differentials across the valve to allow displacement of the working fluid from chamber 108 and prevent engine knock.

Spring 120 maintains the disc against the outer periphery of the valve seat and defines a minimum fluid pressure differential across the valve required to open the valve. However, the disc can be sized and positioned relative to the spring so that a fluid pressure differential of 500 psi causes the disc to flex against the valve plate and seat to the center of plate 112. As pressure rises in chamber 108, the disc spring accelerates flow when the rising pressure is within 500 psi of the working pressure in chamber 127.

Spring 120 also provides a nominal spring force for maintaining ring valve element 124 against valve plate 112, wherein holes 126 supply inlet fluid to the ring valve. The ring valve controls fluid flow into chamber 108, while the spring disk valve controls fluid flow exiting chamber 108. A series of intake oil ports 128 and pressure oil ports 130 communicate working fluid between engine 10 and a hydrostatic motor (not shown).

As such, a predetermined reaction oil pressure is defined in chamber 108 against piston assembly 100 which opposes the combustion forces generated by the hydrocycle engine during operation. When the combustion forces exceed the reaction oil pressure, the spring disc valve quickly opens and reaction piston assembly 100 displaces oil contained within chamber 108 to discharge the oil external of the engine, thereby defining a pump disposed at the head end of the combustion cylinder.

A second fluid chamber 132 is defined by cylinder 14 and head 114 which is distinct from chambers 106 and 108. Fluid chamber 132 employs a second reaction piston assembly or accumulator piston 134. Accumulator piston 134 is reciprocatably disposed within head 114 and contains the working fluid displaced from chamber 108. During engine operation, accumulator piston 134 reciprocates within chamber 132 to maintain the pressure of the accumulator gas in chamber 132 equal to the pressure of the working oil pumped from chamber 108. Therefore, an accumulator chamber is defined which contains the working fluid in the pump to facilitate rapid opening of the disc valve, while dampening transient working fluid pressure pulses produced during engine operation as the disc valve opens and shuts.

Although fluid chamber 132 is contemplated as a sealed chamber prepressurized to a preset pressure near the reaction pressure of the pump, external means for controlling the pressure of the accumulator gas within the accumulator chamber according to changes in the working fluid pressure in the pump is provided in FIG. 1. Means for pressurizing the accumulator chamber include accumulator chamber 132 receiving combustion gas from combustion chamber 106 via a one-way check valve and a controlling spool valve.

Check valve 136 delivers a pressure slightly below peak combustion pressure to provide a source of high pressure gas for pressurizing the accumulator chamber 132 to balance the working pressure in chamber 127. Spool valve housing 138 includes a spool valve element 140 and a minimum pressure valve element 142. Initially during idle compression ignition, elements 140 and 142 are nominally biased by spring 144 so that combustion gas having a pressure in excess of the predetermined pressure of check valve 136 flows through lines 146 and 148 to charge accumulator chamber 132.

During operation, working fluid pressure in chamber 127 biases element 140 to modulate accumulator pressure in chamber 132. Pressure cyclically increases in chamber 132 until it exceeds the working fluid pressure in chamber 127, wherein valve element 140 is oppositely biased to regulate fluid communication of combustion gas to chamber 132 and vent pressure from chamber 132 through line 152 to the engine sump (not shown) and balance the working pressure.

Spool valve 140 also receives as inputs governor fluid pressure from an engine governor through line 154 and throttle pressure from an engine throttle through line 156 to increase charge pressure in chamber 132. Similar to working fluid pressure, governor fluid pressure biases element 140 so that combustion gas is communicated to chamber 132. Similar to accumulator fluid pressure, throttle fluid pressure acts on valve element 140 to reduce fluid communication of combustion gas to chamber 132 and vent pressure from chamber 132 through line 152 to the engine sump.

In this manner, gas pressure within chamber 132 is maintained in balance with the working fluid pressure. As a result, the accumulator functions as a hydrostatic pulse damping system so that oil pressures in chamber 127 are maintained nearly constant. Working pressure between valve elements 140 and 142 lifts the minimum spring load off valve 140 and provides a constant working force on the valve element 140.

Figure 2:
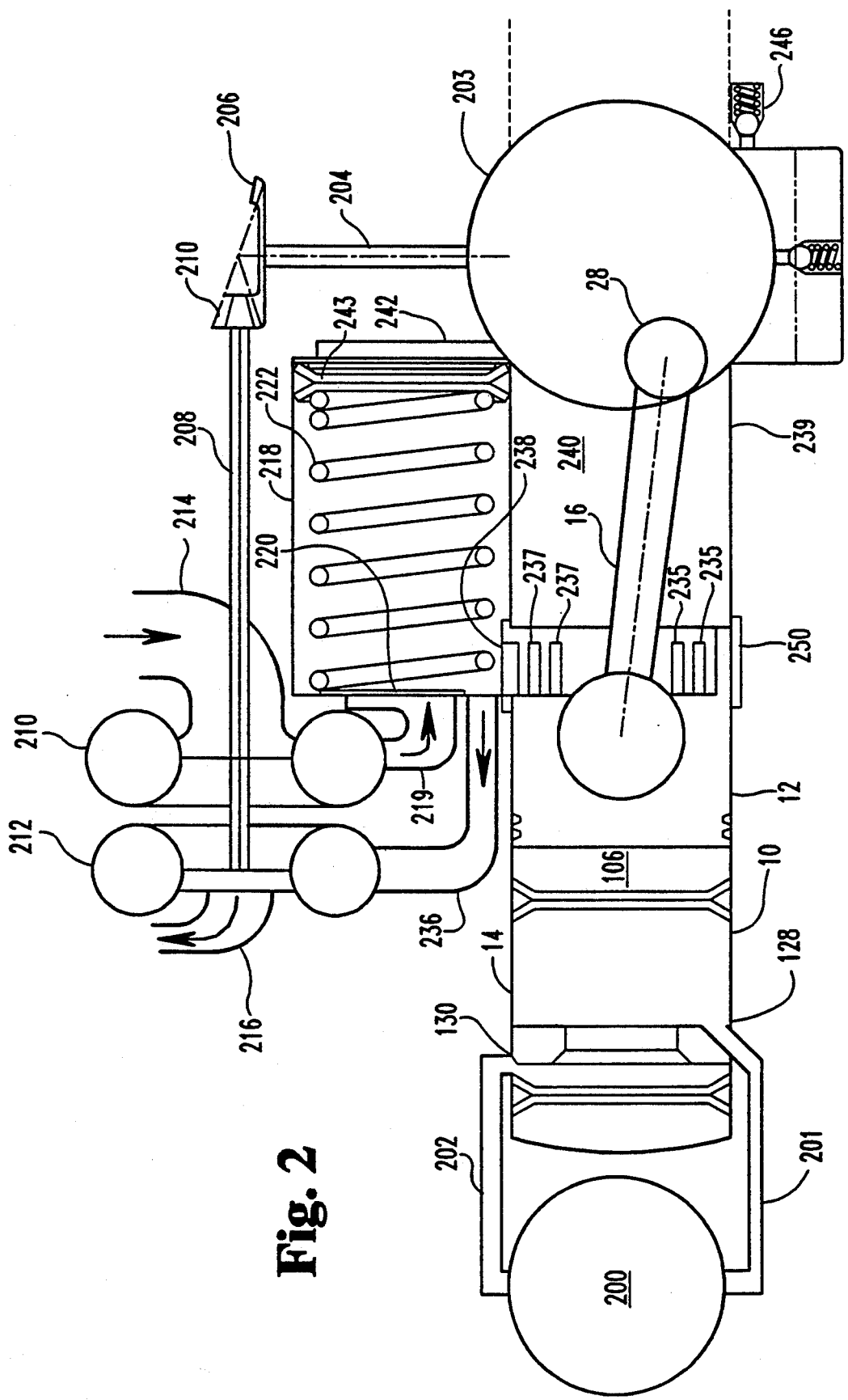
FIG. 2 is a side cross-sectional view of the two cycle internal engine of FIG. 1 connected to a hydrostatic motor and including a compressor, a pulse pressure booster and an exhaust gas turbine.

Referring now to FIG. 2, hydrocycle engine 10 is shown connected to a hydrostatic motor 200 via lines 201 and 202, wherein line 202 communicates high pressure working fluid from pressure port 130 of engine 10 to the hydrostatic motor and line 201 provides low pressure working fluid to intake port 128. Piston 12 and connecting rod 16 provide power to drive crankshaft 28, wherein power is stored in flywheel 203 and mechanically extracted through shafting 204. Shaft 204 incorporates bevel gear 206 at its end, wherein bevel gear 206 engages mating bevel gear 210 of compressor driveshaft 208. Driveshaft 208 is mechanically coupled to compressor 210 so that power extracted from the engine is available for driving the compressor. Compressor 210 is typical of centrifugal compressors employed in the industry, wherein a bladed impeller imparts energy to air drawn through engine air inlet 214 and compresses the air to provide charged air to engine 10. Other compressors mechanically driven by an engine can be employed as well; for example, a Roots blower driven by a belt and pulley arrangement.

Attached to driveshaft 208 is exhaust gas turbine 212, which is similar to those turbines employed in turbochargers in the industry. Power is extracted by turbine 212 from exhaust gas discharged from engine 10 prior to the exhaust gas exiting through exhaust nozzle 216. Because exhaust gas turbine 212 is also mechanically connected to shafting 208, power extracted through the turbine aids in driving compressor 210.

In the embodiment shown in FIG. 2, exhaust gas turbine 212 is directly coupled to the compressor and the engine power take-off shafting 204 and 208 to provide speed limited power transfer. However, engine 10 is also contemplated as including only a compressor mechanically coupled to engine 10 to define a supercharger. Similarly, compressor 210 may be coupled only to exhaust gas turbine 212 so that a free turbine is defined without the mechanical speed limitations of the power take-off shafting.

Compressor 210 supplies pressurized or charged air to pulse pressure booster 218 through inlet line 219. A reed valve 220 permits high pressure air to enter pressure booster 218, while preventing pressurized air from exiting back through line 219.

Engine 10 includes a rotary valve assembly 250 similar to the rotary valve assembly described in my prior U.S. Pat. No. 5,109,810, the disclosure of which was previously incorporated herein by reference. Pulse pressure booster 218 includes an outlet 238 through which the pressure booster supplies pressurized air to rotary valve assembly 250. Rotary valve assembly 250 supplies pressurized air to chamber 106 of cylinder 14 when piston 12 has reciprocated to uncover intake ports 237.

Similarly, exhaust ports 235 exhaust combustion gas through line 236 to turbine 212. In the embodiment shown in FIG. 2, engine 10 includes a sump 239 defining a sump chamber 240. Unlike many engines having a sump vented to atmosphere, sump 239 is sealed so that as piston 12 reciprocates in cylinder 14 air within the sump chamber is pressurized by the downward stroke of the piston. This pressurized air is communicated to pulse pressure booster 218 through inlet line 242. A piston 243 separates pressurized compressor air from pressurized sump gas, while communicating their respective fluid pressures. Therefore, energy transferred from piston 12 to the sump air is utilized to assist in pressurizing air within pulse pressure booster 218.

Because sump chamber 240 is pressurized, engine 10 also incorporates a one-way check valve 246 to control pressure in sump chamber 240 below a predetermined maximum pressure. Pulse pressure booster chamber 218 also incorporates spring 222 to nominally bias piston 243 and prevent unwanted chatter or vibration. Pulse pressure booster 218 transfers energy from air pumped within sump 240 to inlet air supplied to the engine, while maintaining separation of any oil mist present in the sump air from the inlet air supplied by the pulse pressure booster to the combustion chamber.

Figure 3:
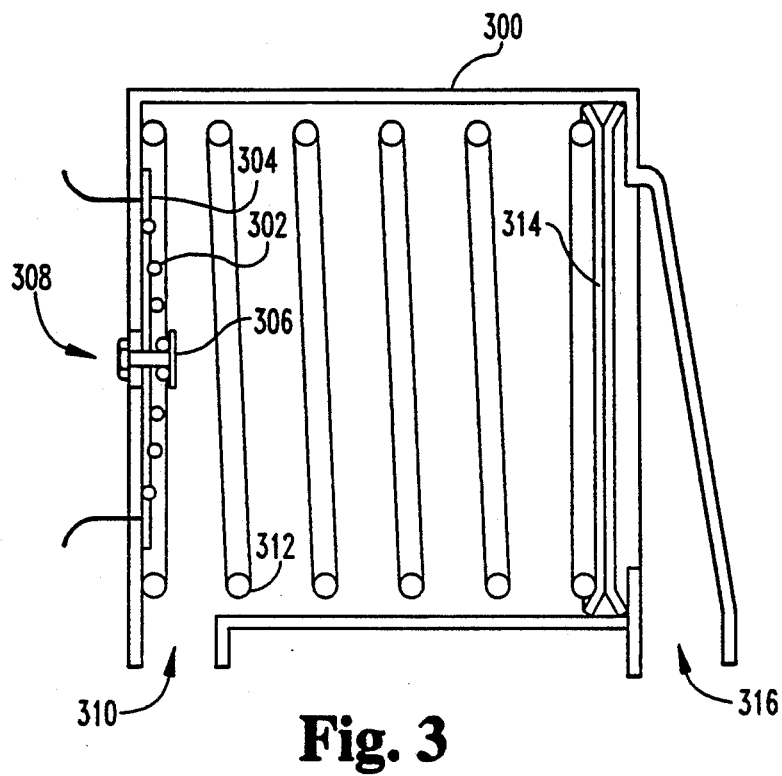
FIG. 3 is a side cross-sectional view of the pulse pressure booster of FIG. 2.

Referring now to FIG. 3, an alternate embodiment of a pulse pressure booster 300 is shown. Pulse pressure booster 300 receives pressurized air from compressor 210 through a disk valve including disk element 304 and spring 302 restrained by fastener 306. Disk element 304 acts similar to a reed valve in that it allows pressurized air to enter booster chamber 300, while preventing back-flow of air from the chamber through inlet line 308. Pulse pressure booster 300 also incorporates a spring 312 biased against piston 314, wherein pressurized inlet air is delivered through outlet 310 to the rotary valve assembly and combustion chamber. Pressurized air from sump chamber 240 is received through inlet 316. Alternately, pulse pressure booster 300 may receive ambient air through inlet line 308, wherein pressurized sump air received through inlet 316 charges the ambient air.

Figure 4:
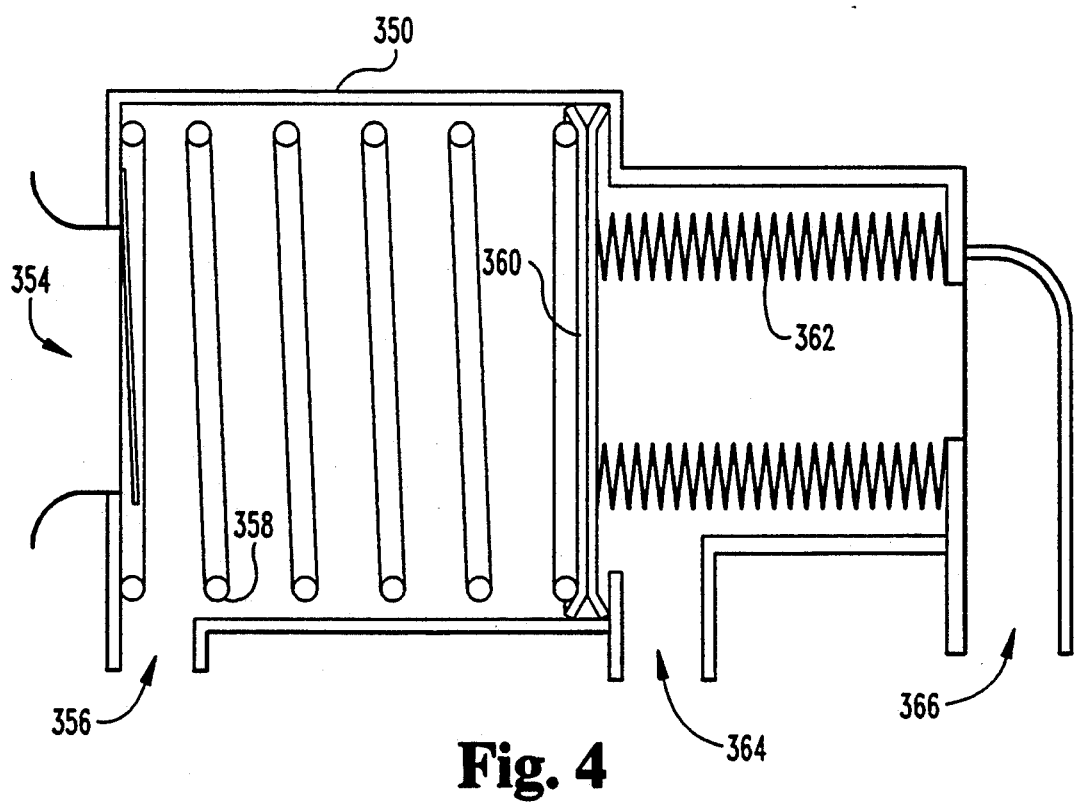
FIG. 4 is a side cross sectional view of a pulse pressure booster according to another embodiment of the present invention and including a piston and bellows.

Also contemplated is pressure booster 350 as shown in FIG. 4, wherein exhaust gas pressure timed to the combustion cycle of engine 10 is received by the pulse pressure booster 350 to assist in pressurizing inlet air. A reed valve 352 acts as a one-way check valve to allow pressurized air to enter through inlet line 354. Piston 360 is biased by spring 358 on one side and a bellows 362 on the other side. Pressurized air from pressure booster 350 is delivered through outlet 356, wherein pressurized exhaust air is received through inlet 366 to act on piston 360. Pressurized air from sump chamber 240 is received through inlet 364 to also act on piston 360. Bellows 362 separates the exhaust air from the sump air, while allowing both the exhaust air and the sump air to act on piston 360 and charge the inlet air to the engine. Alternately, pulse pressure booster 350 may receive ambient air through inlet line 354, wherein pressurized sump air received through inlet 364 and pressurized exhaust air received through inlet 366 charge the ambient air.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An internal combustion engine, comprising:
   a combustion cylinder having a head end and a sump end;
   a sump disposed at the sump end of the combustion cylinder;
   a pump disposed at the head end of the combustion cylinder, said pump containing a working fluid for discharge therefrom;
   a compression piston reciprocatably disposed within said combustion cylinder;
   a power piston reciprocatably disposed within said combustion cylinder, said power piston opposing said compression piston and defining a combustion chamber therebetween;
   a pumping member attached to said power piston, said pumping member being operably disposed within said pump so that movement of the pumping member displaces working fluid within the pump for discharge;
   an accumulator cylinder fluidly connected to the pump; and
   an accumulator piston reciprocatably disposed between said accumulator cylinder and said pump and containing the working fluid therebetween, said accumulator piston further defining an accumulator chamber within said accumulator cylinder for containing pressurized accumulator fluid therein;
   wherein said accumulator piston reciprocates within said accumulator cylinder to maintain the pressure of the accumulator fluid contained therein equal to the pressure of the working fluid contained within the pump.

2. The internal combustion engine of claim 1, and further comprising means for pressurizing and venting the accumulator chamber, said pressurizing and venting means responding to the working fluid pressure in said pump and supplying pressurized accumulator fluid to and venting accumulator fluid from the accumulator chamber in accordance with changes in the working fluid pressure in said pump.

3. The internal combustion engine of claim 2, wherein the accumulator chamber is fluidly connected to the combustion chamber and is fluidly connected to said sump, and wherein said pressurizing and venting means includes means for controlling the supply of pressurized gas from the combustion chamber to the accumulator chamber and means for controlling the venting of gas from the accumulator chamber to said sump.

4. The internal combustion engine of claim 3, and further comprising an engine speed governor fluidly connected to said pressurizing and venting means, said pressurizing and venting means responding to governor fluid pressure and supplying pressurized accumulator fluid to and venting accumulator fluid from the accumulator chamber in accordance with changes in the governor fluid pressure.

5. The internal combustion engine of claim 4, and further comprising a throttle fluidly connected to said pressurizing and venting means, said pressurizing and venting means responding to throttle fluid pressure and supplying pressurized accumulator fluid to and venting accumulator fluid from the accumulator chamber in accordance with changes in the throttle fluid pressure.

6. The internal combustion engine of claim 5, wherein said pressurizing and venting means includes a spool valve, said spool valve biasing the throttle fluid pressure and the accumulator pressure against the governor fluid pressure and the working fluid pressure.

7. The internal combustion engine of claim 6, wherein said accumulator cylinder is integral with said combustion cylinder, said accumulator cylinder being disposed at the head end of the combustion cylinder, and said pump being disposed between the combustion chamber and the accumulator chamber.

* * * * *